UNITED STATES PATENT OFFICE.

ERNST BIDTEL, OF HOBOKEN, NEW JERSEY, ASSIGNOR, BY DIRECT AND MESNE ASSIGNMENTS, TO AMERICAN HYDROLIT COMPANY, OF HOBOKEN, NEW JERSEY, A CORPORATION OF NEW JERSEY.

MAGNESIA CEMENT.

No. 827,286.     Specification of Letters Patent.     Patented July 31, 1906.

Application filed November 11, 1904. Serial No. 232,359.

*To all whom it may concern:*

Be it known that I, ERNST BIDTEL, a citizen of the United States, residing at Hoboken, in the county of Hudson and State of New Jersey, have invented certain new and useful Improvements in Magnesia Cement; and I do hereby declare the following to be a full, clear, and exact description of the invention, such as will enable others skilled in the art to which it appertains to make and use the same.

My invention has for its object to provide a magnesia-cement composition which while retaining all of the advantages of this product as it is now manufactured will overcome the difficulties and disadvantages attending the shipment and use of this product at points distant from the place of manufacture and which will, furthermore, improve the product; and it consists in the combination of constituents and the method of compounding same, hereinafter fully described and claimed.

Magnesia cement as it is now made consists of a dry powder composition of burnt magnesite and a liquid agent consisting of chlorid of magnesium, which is added to the dry powder compound, and any suitable filler at the point where such cement is to be used and causes the mass to set and become hard.

The difficulty and expense incurred in shipping the liquid is a serious obstacle to the more general use of this material, which is superior to other cement by reason of the fact that it is very light, substantially waterproof and fireproof, and exceedingly durable and capable of being well finished, and hence very neat in appearance.

My present invention consists in mixing a concentrated solution of chlorid of magnesium with sawdust or other suitable filler, preferably of a porous nature, which will absorb the solution. Such filler remains very moist and is consequently difficult to handle in certain respects, as, if handled, the hands will be moistened and the effect is very disagreeable. To overcome this difficulty, I add to the thus moistened filler pulverized infusorial earth or fossil-flour, which forms a coating over the particles of filler and takes up surplus moisture and renders the mixture dry and very easy to handle. The thus moistened filler may obviously be easily shipped without danger of loss by leakage, &c., and at much less expense than the liquid.

At the point where such cement is to be used there is added to the above mixture finely-pulverized burnt magnesite and water, which effects the chemical reaction necessary to cause the mass to set and become hard.

The proportions of the various ingredients are substantially as follows to produce the best results where sawdust is employed as a filler: sawdust, thirty-six parts, by weight; magnesium-chlorid solution, (36.8° Baumé,) eighty-five parts; infusorial earth, twenty-five parts. To the above mixture is added at the point where the composition is to be used one hundred parts, by weight, of pulverized burnt magnesite and forty-three and one-half parts, by weight, of water. Of course the proportions of sawdust and infusorial earth may be varied, for instance, by taking more sawdust and less infusorial earth. It is, however, not advisable to use more than sixty parts of sawdust and less than twelve parts of infusorial earth. As the formula above given makes a very inelastic stone, best suitable for floor-tilings, it is not advisable to use any less proportions of sawdust or greater proportions of infusorial earth than those given in the formula, as the stone will then become too inelastic for practical purposes. For larger surfaces, which are to be covered with a continuous flooring and not by tiles, it is advisable to use a greater proportion of sawdust and a less proportion of infusorial earth, but not substantially exceeding the limits above set forth, as otherwise the composition will be too soft and will not wear well. The exact proportions best suitable for the particular floor to be laid must be determined in each instance by climatic conditions, average temperature, and conditions of use. I therefore do not desire to be limited to the exact proportions stated in my claims, but desire them to express approximate proportions, as such approximate proportions will be within the spirit of my invention.

In the formula above given the eighty-five parts of magnesium-chlorid solution, of the strength indicated, combines chemically with about seventy-five parts of pulverized burnt magnesite. The proportions necessary for a complete chemical combination of the magnesium chlorid should always be present; but pulverized burnt magnesite may be added in excess, in which case it acts as a filler. In the formula above given twenty-five of the one hundred parts of pulverized burnt magnesite are added as filler. The infusorial earth is also a valuable addition by reason of the fact that it contains silicic acid, which probably combines with the magnesium oxid to form silicate of magnesium, which is effective in rendering the composition harder, more elastic, more durable, and renders its resistance to water and atmospheric influences far greater.

Suitable coloring-matter—such as drop-black, ocher, umber, red oxid, &c.—may be added as desired without affecting the composition.

I claim as my invention—

1. The combination of substantially thirty-six parts by weight of sawdust, eighty-five parts of magnesium-chlorid solution (36.8° Baumé) and twenty-five parts of infusorial earth, forming a substantially dry ingredient of magnesium cement.

2. The herein-described composition of matter, which consists substantially of thirty-six parts by weight of an absorbent filler, eighty-five parts of magnesium-chlorid solution (36.8° Baumé), twenty-five parts infusorial earth, seventy-five parts pulverized burnt magnesite, and forty-three and one-half parts water.

In testimony whereof I have signed my name in presence of two subscribing witnesses.

ERNST BIDTEL.

Witnesses:
 RUDOLPH WM. LOTZ,
 F. SCHLOTFELD.